US007777361B2

(12) United States Patent
Hsieh

(10) Patent No.: US 7,777,361 B2
(45) Date of Patent: Aug. 17, 2010

(54) TURBINE VENTILATOR FOR GENERATING ELECTRICITY

(76) Inventor: Chen-Hui Hsieh, No. 32, Lane 457, Nanshi Sec. 2, Chongfon Road, Pinjen City, Taoyuan Hsien 32463 (TW)

( * ) Notice: Subject to any disclaimer, the term of this patent is extended or adjusted under 35 U.S.C. 154(b) by 430 days.

(21) Appl. No.: 12/009,925

(22) Filed: Jan. 23, 2008

(65) Prior Publication Data
US 2009/0184520 A1 Jul. 23, 2009

(51) Int. Cl.
*F03D 9/00* (2006.01)
(52) U.S. Cl. ........................................................ 290/55
(58) Field of Classification Search ................ 290/55
See application file for complete search history.

(56) References Cited

U.S. PATENT DOCUMENTS

| 3,707,812 A | * | 1/1973 | Roessl | 290/55 |
| 4,012,163 A | * | 3/1977 | Baumgartner et al. | 415/208.3 |
| 4,379,972 A | * | 4/1983 | Sosa et al. | 290/44 |
| 6,703,718 B2 | | 3/2004 | Calley et al. | 290/44 |
| 6,798,082 B1 | * | 9/2004 | Chen | 290/55 |
| 6,800,955 B2 | | 10/2004 | McDavid, Jr. | 290/54 |
| 7,319,279 B2 | * | 1/2008 | Korner | 290/55 |
| 2008/0265584 A1 | * | 10/2008 | Teng | 290/55 |

FOREIGN PATENT DOCUMENTS

| CA | 2420491 A1 * | 8/2004 |
| WO | WO 2006138747 A2 * | 12/2006 |

* cited by examiner

*Primary Examiner*—Joseph Waks
(74) *Attorney, Agent, or Firm*—Charles E. Baxley

(57) ABSTRACT

A turbine ventilator includes a housing having a hub, a tube having a lower segment secured to the hub, a seat disposed on an upper portion of the tube, an electric generator disposed on the seat and having a rotor and an extension secured to the rotor and extended out of the generator, a carrier rotatably attached to the tube, and a number of blades each having a lower portion secured to the carrier and an upper portion secured to the extension of the rotor for rotating the extension of the rotor relative to the generator in order to generate an electric energy. The extension of the rotor includes a relatively shorter length for allowing the rotor to be effectively rotated relative to the generator by the blades.

8 Claims, 5 Drawing Sheets

TURBINE VENTILATOR FOR GENERATING ELECTRICITY

BACKGROUND OF THE INVENTION

1. Field of the Invention

The present invention relates to a turbine ventilator, and more particularly to a turbine ventilator including a simplified structure for effectively generating an electricity or an electric current or energy and for allowing the turbine ventilator to be easily manufactured and assembled, and for allowing the turbine ventilator to be effectively operated.

2. Description of the Prior Art

Typical turbine ventilators comprise a rotatable member rotatably attached to a lower supporting base and coupled to a generator with one or more shafts for operating the generator to generate an electricity or an electric current or energy.

For example, U.S. Pat. No. 4,379,972 to Sosa et al. discloses one of the typical turbine ventilators comprising a housing having a lower supporting base, and a rotatable member rotatably attached to the lower supporting base of the housing and coupled to a generator with one or more shafts for operating the generator to generate an electricity or an electric current or energy.

However, the shafts coupled between the rotatable member and the generator are very long such that the rotatable member is disposed outside the generator, or the generator is relatively disposed outside the rotatable member such that the rotor of the generator may not be effectively operated or driven by the rotatable member.

U.S. Pat. No. 6,703,718 to Calley et al. discloses another typical wind turbine controller comprising an armature or stator attached to a nacelle, and a hub including three blades and including a rotor rotatably attached to the stator, and a number of windings attached to the stator for being actuated or operated to generate an electricity or an electric current or energy.

However, the rotatable elongated blades are dangerous and may hurt people such that the typical wind turbine controller may not be provided for family uses, and also may not be easily attached to the house buildings by the users themselves.

U.S. Pat. No. 6,800,955 to McDavid, Jr. discloses a further typical fluid powered energy conversion device disposed in a moving fluid for converting an energy in the moving fluid into a mechanical energy, and comprising a rigid cylindrical frame of toroidal baffles forming an upstream annular chamber and a downstream annular chamber, and a number of hinged louvers surround the vortex chambers.

However, the typical fluid powered energy conversion device includes a complicated structure that may not be easily manufactured or assembled.

The present invention has arisen to mitigate and/or obviate the afore-described disadvantages of the conventional turbine ventilators.

SUMMARY OF THE INVENTION

The primary objective of the present invention is to provide a turbine ventilator including a simplified structure for effectively generating an electricity or an electric current or energy and for allowing the turbine ventilator to be easily manufactured and assembled, and for allowing the turbine ventilator to be effectively operated.

In accordance with one aspect of the invention, there is provided a turbine ventilator comprising a housing including a compartment formed therein and including a hub provided in the housing, a tube including a lower segment secured to the hub of the housing, and including a seat disposed on an upper portion of the tube, an electric generator disposed on the seat, and including a rotor rotatably disposed in the generator, and including an extension secured to the rotor and extended out of the generator, a carrier rotatably attached to the tube, and a number of blades each including a lower portion secured to the carrier, and each including an upper portion secured to the extension of the rotor for rotating the extension of the rotor relative to the generator in order to generate an electric energy. It is to be noted that the generator is disposed within the blades, and the extension of the rotor is relatively shorter then that of the typical turbine ventilators for allowing the extension of the rotor to be effectively rotated relative to the generator by the blades.

A panel is further provided and secured to the extension of the rotor, and a cover is secured to the upper portions of the blades and secured to the panel for indirectly securing the blades to the extension of the rotor.

The upper portion of the tube includes an outer diameter greater than that of the tube for forming an annular shoulder in the tube and for engaging with the carrier and for anchoring the carrier to the tube.

The lower segment of the tube includes an outer diameter smaller than that of the tube for forming an annular shoulder in the tube and for engaging with the hub of the housing and for anchoring the tube to the housing.

A support is further provided and includes a chamber formed therein, and including an upper portion, and the housing is engaged into the upper portion of the support and secured to the support. The housing includes at least one bar coupled between the housing and the hub of the housing.

The carrier includes a hub having a bore formed in the hub of the carrier for rotatably receiving the tube and for rotatably attaching the carrier to the tube. The carrier includes a peripheral wall, and includes at least one beam coupled between the peripheral wall and the hub of the carrier.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
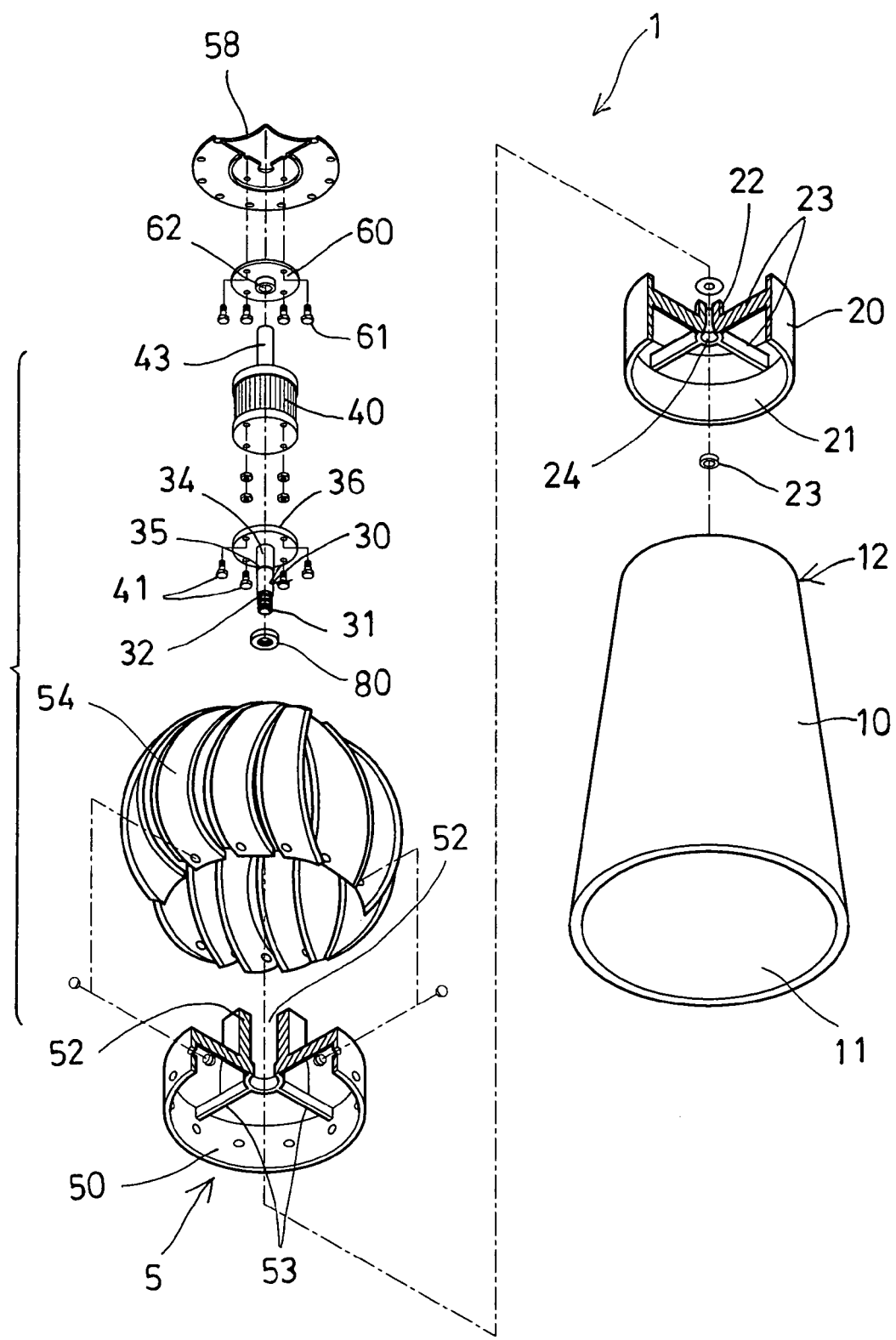
FIG. 1 is an exploded view of a turbine ventilator in accordance with the present invention.
Figure 2:
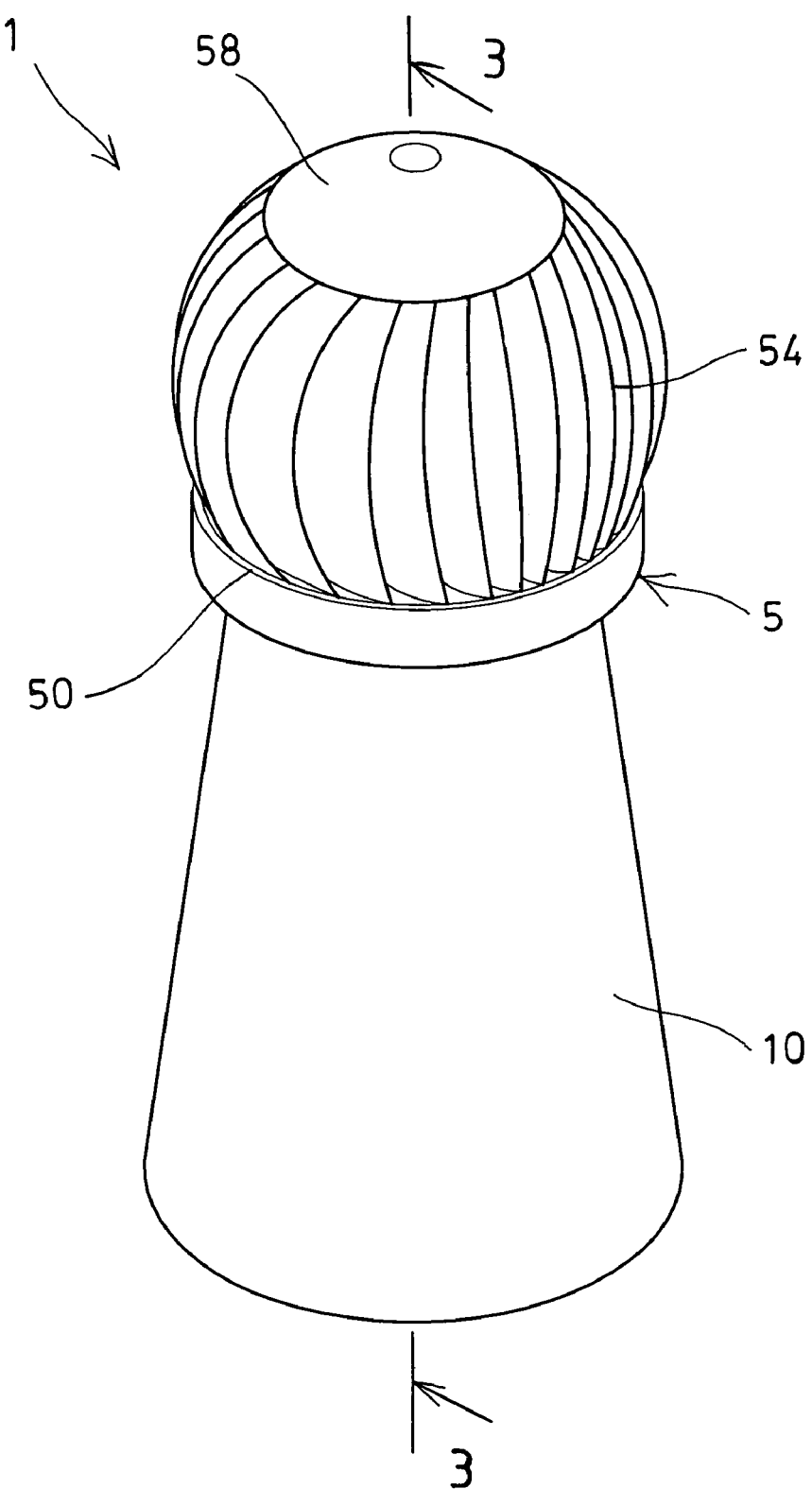
FIG. 2 is a perspective view of the turbine ventilator.
Figure 3:
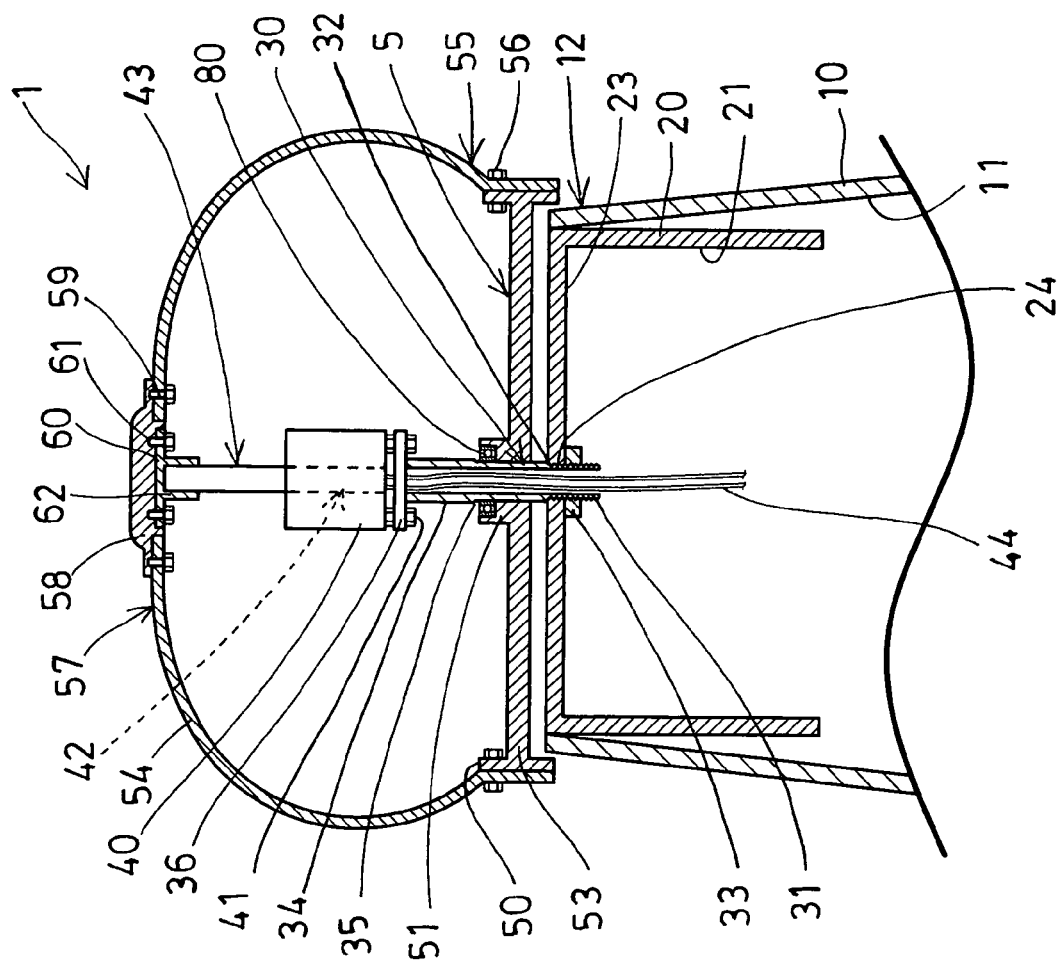
FIG. 3 is a partial cross sectional view of the turbine ventilator taken along lines 3-3 of FIG. 2.

Referring to the drawings, and initially to FIGS. 1-3, a turbine ventilator in accordance with the present invention comprises a base support 10 including such as a frustum-shaped structure having a chamber 11 formed therein, and including an upper portion 12, and a housing 20 disposed or engaged into the upper portion 12 of the base support 10 and secured to the base support 10 with such as fasteners or latches (not shown), adhesive materials, or by welding processes, the housing 20 includes a compartment 21 formed therein and includes a hub 22 provided or disposed in the center portion of the housing 20, and includes one or more bars 23 coupled between the housing 20 and the hub 22, and the hub 22 includes a bore 24 formed therein.

A tube 30 includes a lower threaded portion or segment 31 and having an outer diameter smaller than that of the tube 30 for forming an annular shoulder 32 between the threaded segment 31 and the tube 30 and for engaging with the hub 22 of the housing 20, and thus for anchoring or securing the tube 30 to the housing 20, and a lock nut 33 may be threaded or engaged with the threaded segment 31 of the tube 30 for solidly securing the tube 30 to the housing 20. The tube 30 further includes an enlarged upper portion or segment 34 having an outer diameter greater than that of the tube 30 for forming another annular shoulder 35 between the enlarged upper segment 34 and the tube 30, and a seat 36 disposed on top of the enlarged upper segment 34 of the tube 30, in which the seat 36 may be secured to the tube 30 with one or more latches or fasteners (not shown), adhesive materials, or by welding processes for allowing the tube 30 and the seat 36 to be rotated in concert with each other.

An electric generator 40 is disposed or engaged onto the seat 36 and secured to the seat 36 with one or more latches or fasteners 41, and includes a rotor 42 rotatably attached to or disposed in the generator 40 for rotating relative to a stator (not shown) and for generating an electricity or an electric current or energy, and includes an extension 43 secured to or formed integral with the rotor 42 and extended out of the generator 40, and one or more electric cables or wires 44 engaged through the tube 30 and electrically coupled to the generator 40 for supplying the electric current or energy generated by the generator 40 out to the other electric facilities.

A rotatable member or carrier 5 includes a peripheral wall 50, and includes a hub 51 disposed in the center portion of the peripheral wall 50 of the carrier 5 and having a bore 52 formed in the hub 51 for rotatably receiving the tube 30 and for rotatably attaching or securing the carrier 5 to the tube 30 with one or more bearings 80, and includes one or more beams 53 coupled between the peripheral wall 50 and the hub 51. The hub 51 of the carrier 5 may be engaged with the annular shoulder 35 of the tube 30 for anchoring or securing the hub 51 of the carrier 5 to the tube 30 and for preventing the carrier 5 from moving up and down relative to the tube 30.

A number of blades 54 each include a lower portion 55 secured to the peripheral wall 50 of the carrier 5 with one or more latches or fasteners 56, and each include an upper portion 57 directly secured to the extension 43 of the rotor 42, or indirectly secured to a cover 58 with one or more latches or fasteners 59. A panel 60 is secured to the cover 58 with one or more latches or fasteners 61, and includes a further hub 62 extended downwardly therefrom for receiving the extension 43 of the rotor 42 and for securing to the extension 43 of the rotor 42 with such as one or more fasteners or latches (not shown), adhesive materials, or by welding processes, and for allowing the extension 43 of the rotor 42 to be rotated relative to the generator 40 by the blades 54 that may be blown or rotated or driven by the wind, and thus for generating an electricity or an electric current or energy.

In operation, as shown in FIG. 3, the extension 43 of the rotor 42 may be rotated relative to the stator of the generator 40 by the blades 54 for generating an electricity or an electric current or energy. It is to be noted that the extension 43 of the rotor 42 includes a relatively shorter length as compared with that of the typical turbine ventilators for allowing the extension 43 of the rotor 42 to be effectively rotated relative to the generator 40 by the blades 54.

Figure 4:
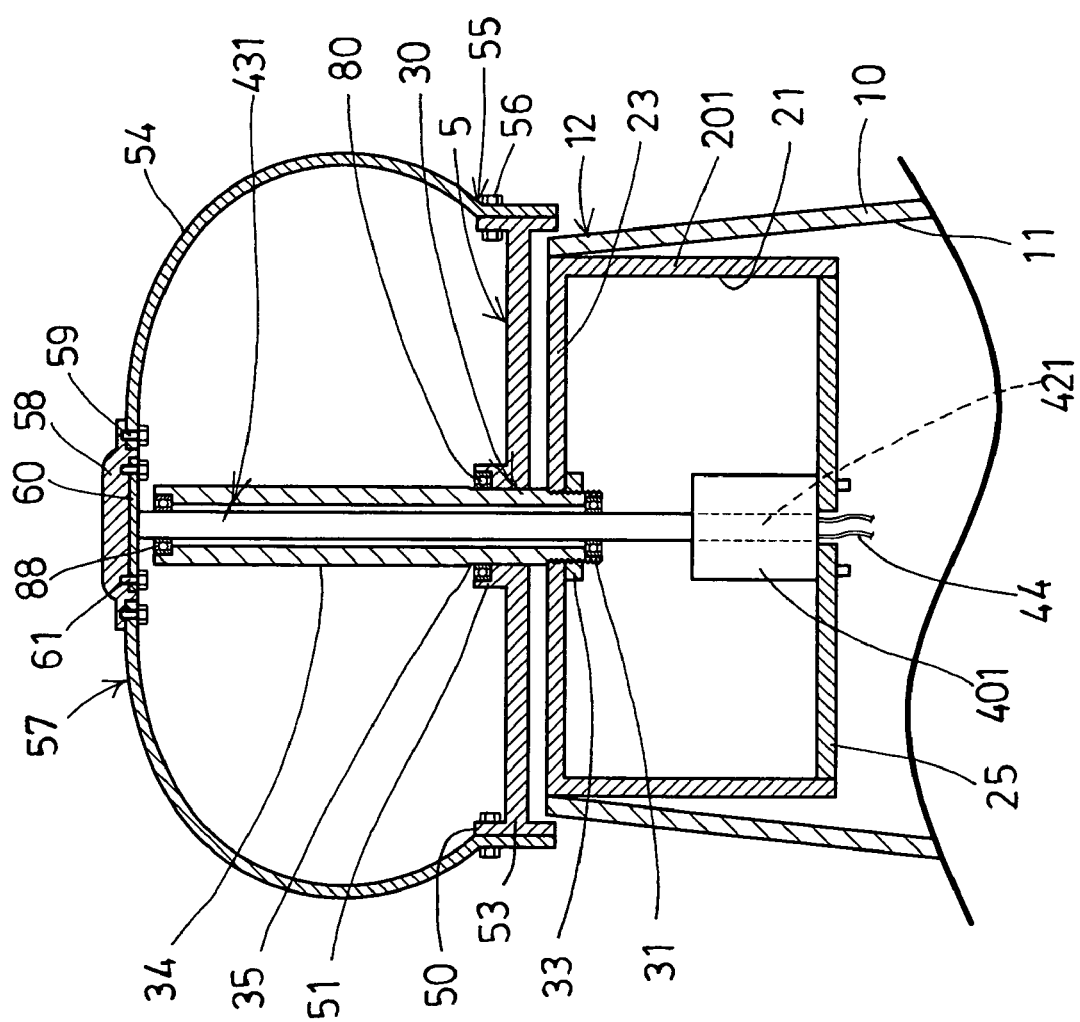
FIG. 4 is another partial cross sectional view similar to FIG. 3, illustrating the other arrangement of the turbine ventilator.

Alternatively, as shown in FIG. 4, the housing 201 may include a bottom board 25 for disposing or supporting the generator 401, and the extension 431 of the rotor 421 may include a relatively greater length than that shown in FIG. 3 and may be rotatably engaged through the tube 30 and rotatably secured to the tube 30 with one or more bearings 88, and may be secured to the panel 60 with one or more latches or fasteners 61 for allowing the extension 431 of the rotor 421 to be rotated relative to the generator 401 by the blades 54.

Figure 5:
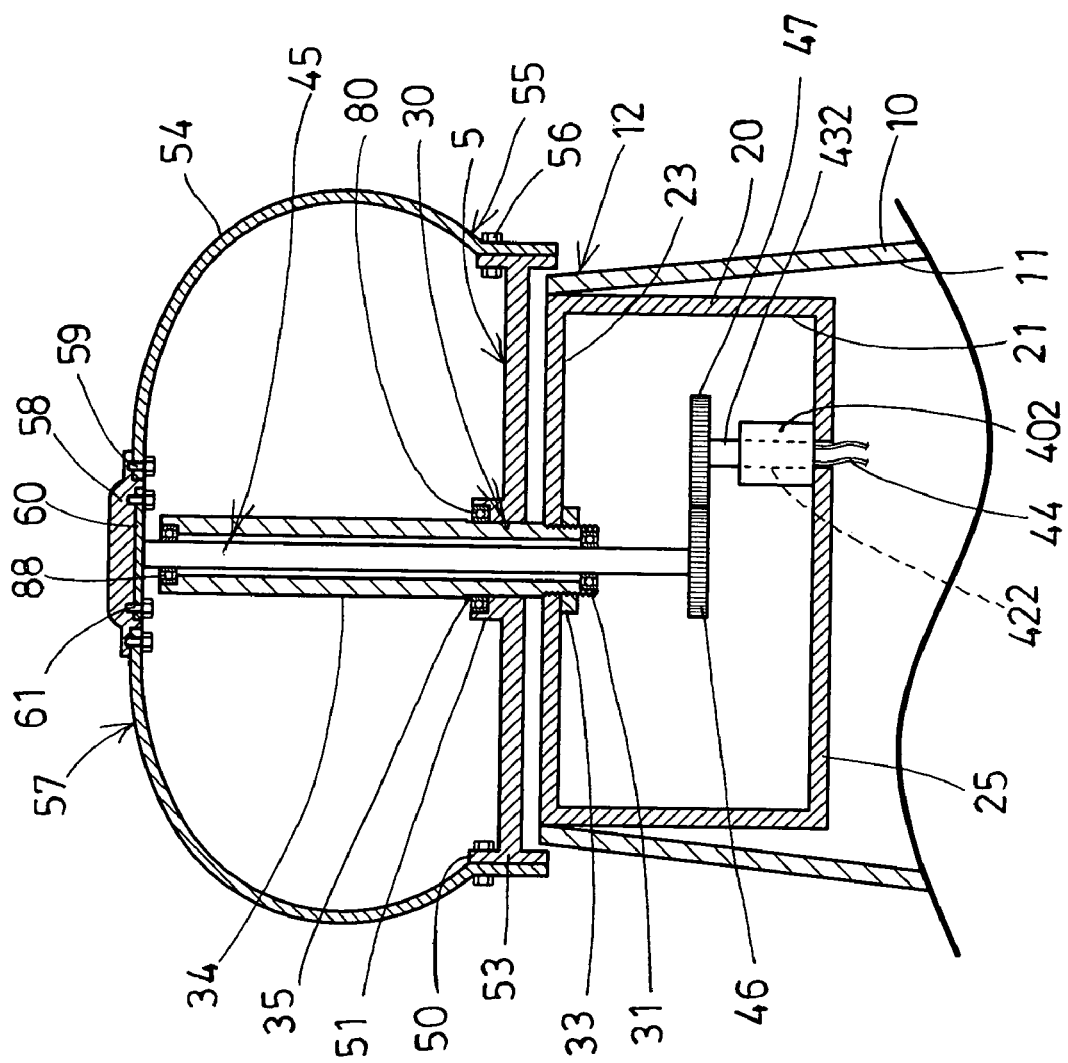
FIG. 5 is a further partial cross sectional view similar to FIGS. 3 and 4, illustrating the further arrangement of the turbine ventilator.

Further alternatively, as shown in FIG. 5, a shaft 45 may be rotatably engaged through the tube 30 and rotatably secured to the tube 30 with one or more bearings 88, and may be secured to the panel 60 with one or more latches or fasteners 61 for allowing the shaft 45 to be rotated relative to the tube 30 by the blades 54, and the shaft 45 may include a pinion 46 attached to the lower portion thereof, and the extension 432 of the rotor 422 of the generator 402 may include a gear 47 attached to the upper portion thereof and engaged with the pinion 46 for allowing the extension 432 of the rotor 422 of the generator 402 to be rotated relative to the generator 402 by the blades 54 and the shaft 45.

Accordingly, the turbine ventilator in accordance with the present invention includes a simplified structure for effectively generating an electricity or an electric current or energy and for allowing the turbine ventilator to be effectively operated.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A turbine ventilator comprising:
    a housing including a compartment formed therein and including a hub provided in said housing,
    a tube including a lower segment secured to said hub of said housing, and including a seat disposed on an upper portion of said tube,
    an electric generator disposed on said seat, and including a rotor rotatably disposed in said generator, and including an extension secured to said rotor and extended out of said generator,
    a carrier rotatably attached to said tube, and
    a plurality of blades each including a lower portion secured to said carrier, and each including an upper portion secured to said extension of said rotor for rotating said extension of said rotor relative to said generator in order to generate an electric energy.

2. The turbine ventilator as claimed in claim 1, wherein a panel is secured to said extension of said rotor, and a cover is secured to said upper portions of said blades and secured to said panel for securing said blades to said extension of said rotor.

3. The turbine ventilator as claimed in claim 1, wherein said upper portion of said tube includes an outer diameter greater than that of said tube for forming an annular shoulder in said tube and for engaging with said carrier.

4. The turbine ventilator as claimed in claim 1, wherein said lower segment of said tube includes an outer diameter smaller than that of said tube for forming an annular shoulder in said tube and for engaging with said hub of said housing.

5. The turbine ventilator as claimed in claim 1 further comprising a support including a chamber formed therein, and including an upper portion, and said housing is engaged into said upper portion of said support and secured to said support.

6. The turbine ventilator as claimed in claim 1, wherein said housing includes at least one bar coupled between said housing and said hub of said housing.

7. The turbine ventilator as claimed in claim 1, wherein said carrier includes a hub having a bore formed in said hub of said carrier for rotatably receiving said tube and for rotatably attaching said carrier to said tube.

8. The turbine ventilator as claimed in claim 7, wherein said carrier includes a peripheral wall, and includes at least one beam coupled between said peripheral wall and said hub of said carrier.

* * * * *